May 10, 1955 J. BARBER 2,707,935
SEED TREATER
Filed Jan. 16, 1950 2 Sheets-Sheet 1
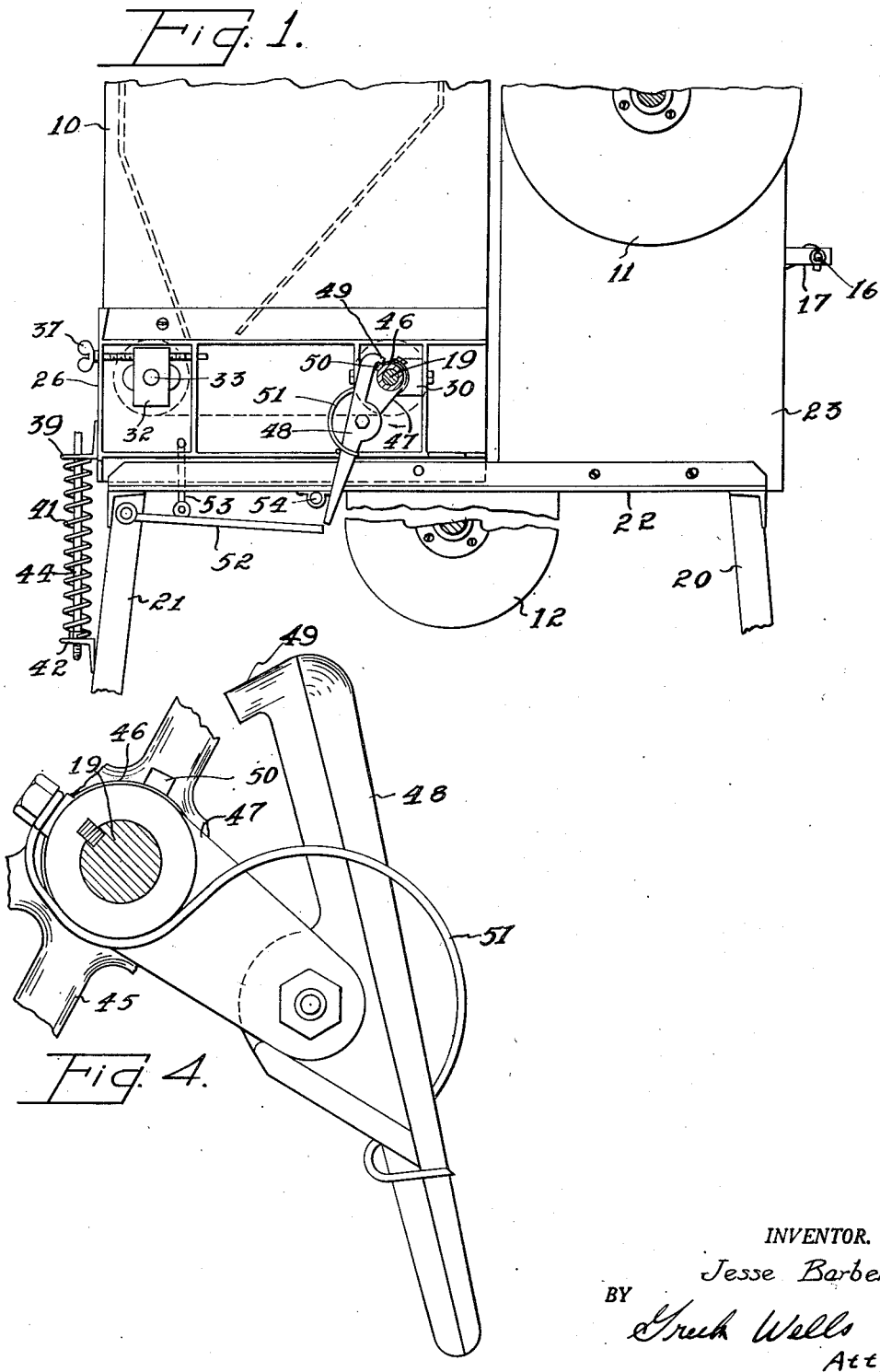
INVENTOR.
Jesse Barber
BY
Fred Wells
Atty.

May 10, 1955
J. BARBER
2,707,935
SEED TREATER
Filed Jan. 16, 1950
2 Sheets-Sheet 2
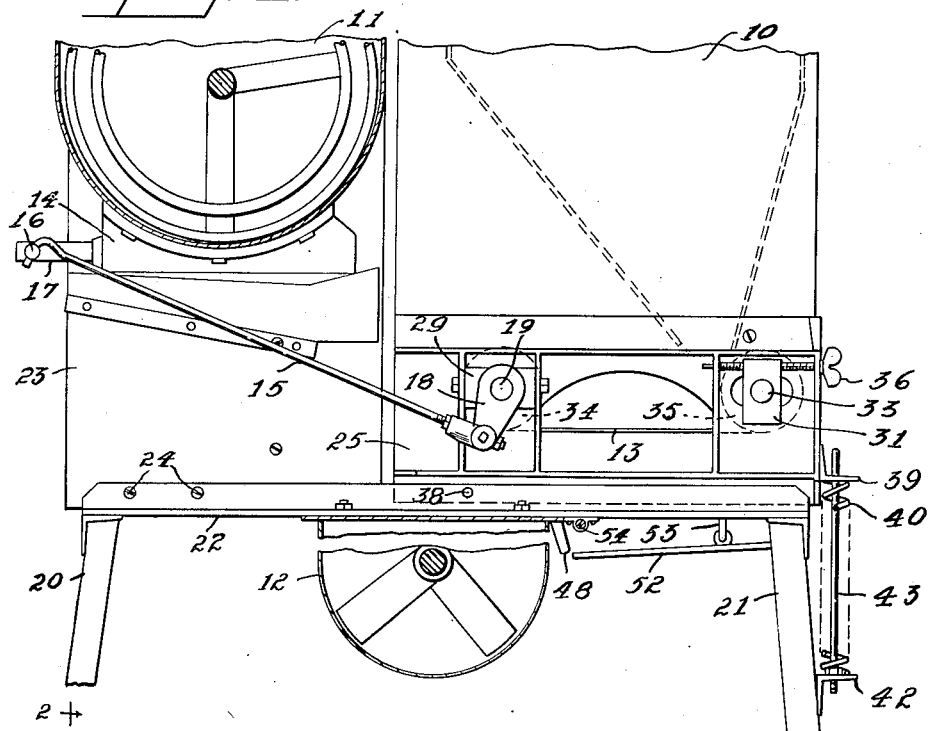
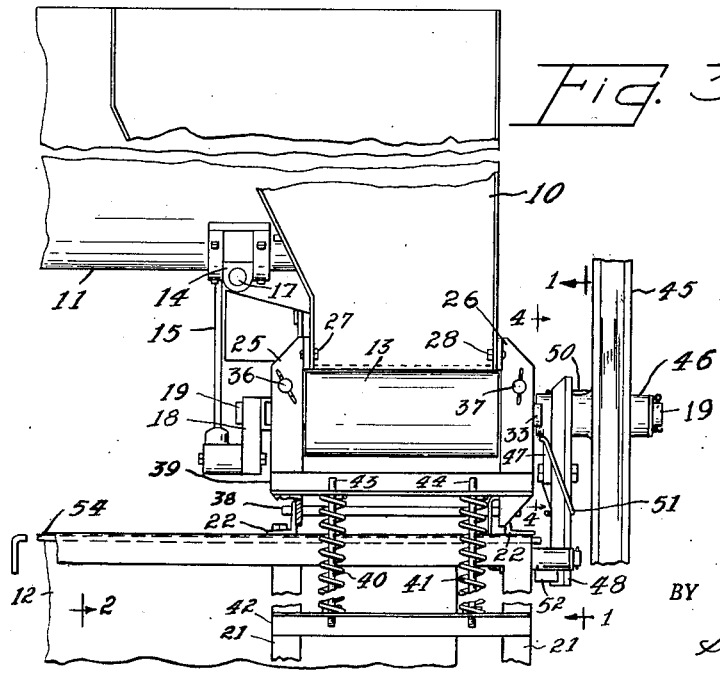
INVENTOR.
Jesse Barber
BY
Greek Wells
Atty.

United States Patent Office 2,707,935
Patented May 10, 1955

2,707,935

SEED TREATER

Jesse Barber, Spokane, Wash.

Application January 16, 1950, Serial No. 138,920

2 Claims. (Cl. 118—417)

The present invention relates to improvements in a seed treater.

It is the present practice to treat most seeds before planting with various chemicals to prevent disease. The seed treating machines usually embody a mixing trough in which the seed and the chemical are stirred together. The chemical itself is fed to the mixing trough in the form of a powder or fluid suspension and is fed in measured quantity proportionate to the amount of seed fed into the trough. A seed treater having one form of feed mechanism is illustrated in my prior application, Serial No. 81,513, now abandoned. In this type of machine the seed is fed to the mixing trough by a conveyor belt which withdraws the seed from a hopper over the belt and delivers it into the mixing trough. The chemical feed is operated from the belt drive shaft so that it is proportioned to the travel of the belt.

One of the problems in connection with a machine of this character is that of controlling the feeding of the mechanism so if the hopper that supplies the belt with seed runs dry the feed of chemical will also be cut off. It is the purpose of the present invention to provide a simple mechanism for effecting this result. My invention contemplates the provision of an automatic control device effective when the hopper is empty to stop the feed belt drive shaft and thus stop the chemical feed. Means are also provided for manually stopping the feed belt drive shaft at any time by making use of the automatic mechanism.

The nature and advantages of my invention will appear more fully from the following description and the accompanying drawings illustrating a preferred form thereof. The drawings and description are however, illustrative only, and are not intended to limit the invention except insofar as it is limited by the claims.

In the drawings:

Figure 1 is an end view of the seed treating machine with the drive shaft shown in section as if cut on the line 1—1 of Figure 3.

Figure 2 is a view taken looking in the opposite direction of Figure 1 substantially on the line 2—2 of Figure 3.

Figure 3 is a fragmentary side view of the machine looking at the left hand side of Figure 1; and Figure 4 is an enlarged sectional view taken on the line 4—4 of Figure 3.

Referring now to the drawing, the seed treating machine illustrated comprises a seed hopper 10, a tank 11 for the chemical slurry, a mixing trough 12, a feed belt 13 for feeding seed into the trough and a chemical slurry measuring and delivering mechanism 14 for delivering the chemical to the trough. The detailed construction of the mixing mechanism in the chemical tank 11 and in the trough 12 are not shown since they form no part of the present invention. The chemical measuring and delivering mechanism 14 is essentially that shown in my prior application referred to above. A drive link 15 has one end connected to a pin 16 that is pivoted in the piston 17 of the chemical feeding mechanism. The other end of the link 15 connects to a crank arm 18 that is fixed on a drive shaft 19 for the belt 13. The several parts described are supported upon a stand having legs 20 and 21 and frame members 22. The tank 11 is supported by a pair of end plates, only one of which is shown at 23. These plates serve to removably support the tank 11 on the frame. They are fastened by screws 24 to the frame members 22.

The hopper 10 and the belt 13 are carried by a framework that is pivoted on the frame members 22. The framework comprises two side frame castings 25 and 26 which are bolted to the hopper as illustrated at 27 and 28. The frame members 25 and 26 carry bearing blocks indicated at 29 and 30 for the shaft 19. The side frame members 25 and 26 also carry bearing blocks 31 and 32 for a shaft 33. The shafts 19 and 33 carry pulleys 34 and 35 on which the belt 13 is mounted. The bearing blocks 31 and 32 are adjustable in the side frames 25 and 26 to maintain the belt 13 taut. Adjusting screws 36 and 37 are shown for this purpose. In order to pivotally support the mechanism just described a shaft 38 connects the side frame members 25 and 26 to the supporting frame members 22. The shaft 38 is placed near the left hand end of the side frame members 25 and 26 as shown in Figure 2. This is the end opposite where the hopper 10 opens upon the belt 13. The side frame members 25 and 26 are spring supported at the end opposite the shaft 38. An angle iron 39 connects the two side frame members and rests upon supporting springs 40 and 41. The lower ends of the springs 40 and 41 are supported by an angle iron 42 that extends between the two legs 21 of the supporting frame of the machine. Guide pins 43 and 44 are provided on the angle iron 42 to keep the springs 40 and 41 in place.

It is obvious that with the construction just described the hopper, the belt and the side frames can be balanced by the springs 40 and 41 so that when the hopper is empty of grain the springs will lift the side frames 25 and 26 and the hopper. I utilize this motion to control the drive of the shaft 19.

The method by which the control is accomplished will now be described. A drive pulley 45 has its hub 46 journalled on the shaft 19. The pulley is driven from any suitable power source such as the same motor that drives the mixing mechanism in the tank 10 and the trough 12. Between the side frame 26 and the hub 46 an arm 47 is fixed on the shaft 19. The arm 47 carries a trip pawl 48 which overlies a portion of the hub 46 and has an end 49 which engages a lug 50 on the hub 46. A spring 51 is so mounted on the arm 47 and the pawl 48 that it urges the pawl 48 toward the hub 46 at all times. It is evident that when the pawl 48 is in engagement with the lug 50 on the hub 46 the arm 47 will be caused to rotate with the hub 46 and in turn will rotate the shaft 19. However, if the pawl 48 is lifted away from the lug 50 the hub 46 can rotate independently of the shaft 19.

In order to stop the rotation of the shaft 19 when the hopper 10 is empty, I pivot a stop bar 52 on the leg 21 of the supporting frame. A link 53 is pivoted to the side frame 26 and to the arm 52. When the hopper is empty the springs 40—41 will lift the frame member 26 and bring the free end of the arm 52 into the path of the pawl 48. The pawl will thus become separated from the lug 50 on the hub 46 so that power no longer will be applied to the shaft 19. This stops the feed of both the seed and the chemical until such time as the hopper is again filled. Of course when the hopper is filled the arm 52 will be pushed down out of the way, thus allowing the machine to start up again.

The pawl 48 can also be thrown out of engagement with the hub 46 by a manual control which comprises a rod 54 that is carried on the frame members 22 and extends into the path of the pawl 40 when it is shoved to the right of the position shown in Figure 3.

It is believed that the nature and advantages of my invention will be clear from the foregoing description. Having thus described my invention I claim:

1. In a seed treating machine, a frame, a seed hopper pivoted thereon, a chemical tank, a mixing trough, chemical delivery means operating between said chemical tank and said mixing trough to deliver chemicals to said trough, a belt conveyor positioned below a seed outlet in said hopper operable to convey seed from said hopper to said trough, means operable to raise said pivoted hopper when empty, a drive shaft operating said chemical delivery means and said seed conveyor belt, a drive pulley rotatable on said shaft, an arm whose end is fixed to said drive shaft, a trip pawl pivotally mounted on the end of said arm most remote from said drive shaft, said pawl being springingly urged toward the hub of said drive pulley, a stop bar on the frame, and connected with said hopper to move into the path of said pawl and hold it away from the pulley hub when the hopper is raised, a lug on the hub of said drive pulley and said pawl engaging said lug when the hopper is lowered.

2. In a seed treating machine, a frame, a seed hopper pivoted thereon, a chemical tank, a mixing trough, chemical delivery means operating between said chemical tank and said mixing trough to deliver chemicals to said trough, a belt conveyor positioned below a seed outlet in said hopper operable to convey seed from said hopper to said trough, means operable to raise said pivoted hopper when empty, a drive shaft operating said chemical delivery means and said seed conveyor belt, a drive pulley rotatable on said shaft, an arm whose end is fixed to said drive shaft, a trip pawl pivotally mounted on the end of said arm most remote from said drive shaft, said pawl being springingly urged toward the hub of said drive pulley, a lug on the hub of said drive pulley and said pawl engaging said lug, and a manual control bar slidably mounted in apertures in said frame to contact said trip pawl and disengage it from said lug on the hub of said drive pulley.

References Cited in the file of this patent

UNITED STATES PATENTS

| | | |
|---|---|---|
| 1,558,580 | Bishop | Oct. 27, 1925 |
| 1,698,436 | Hendrickson | Jan. 8, 1929 |
| 2,487,533 | Eastman | Nov. 8, 1949 |